Sept. 17, 1935.  L. M. ANDREWS  2,014,642
LUBRICATION DEVICE
Filed June 27, 1932    3 Sheets-Sheet 1

INVENTOR.
LLOYD M. ANDREWS
BY
ATTORNEY.

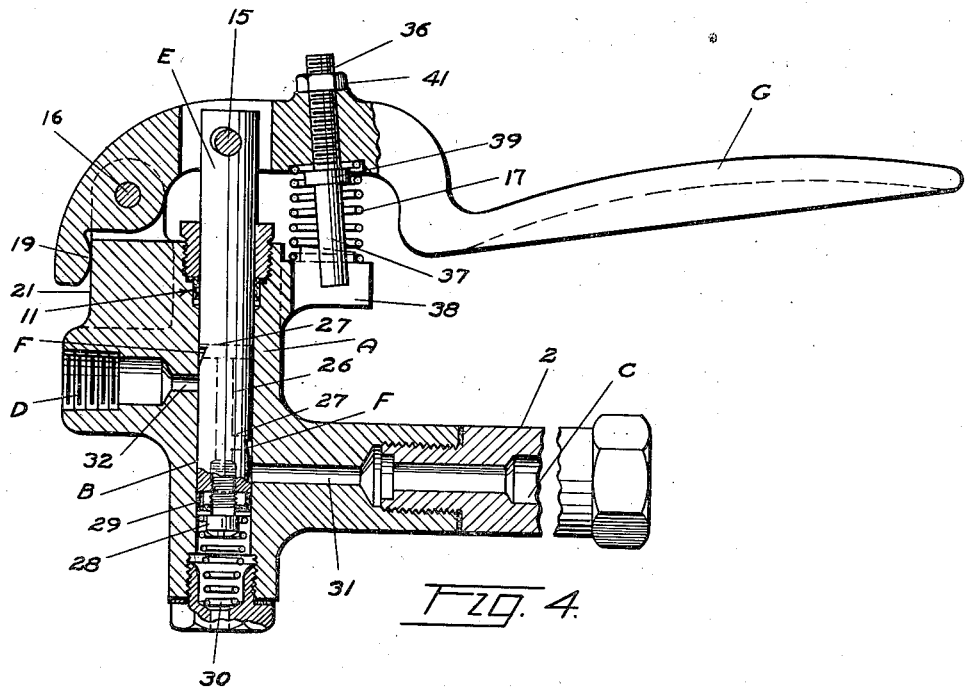
Fig. 4.
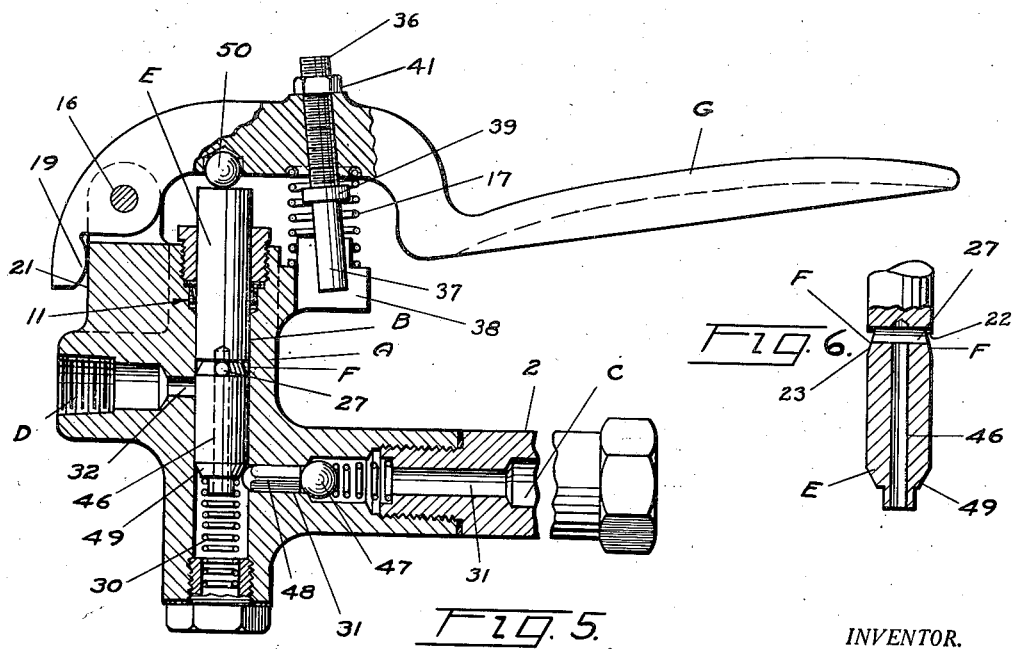
Fig. 5.
Fig. 6.
INVENTOR.
LLOYD M. ANDREWS
BY
ATTORNEY.

Patented Sept. 17, 1935

2,014,642

UNITED STATES PATENT OFFICE 2,014,642

LUBRICATION DEVICE

Lloyd M. Andrews, South Bend, Ind., assignor to
The Lubrication Corporation, South Bend, Ind.,
a corporation of Delaware Application June 27, 1932, Serial No. 619,382

14 Claims. (Cl. 251—75)

This invention relates to improvements in lubricating devices and more particularly to control valves for regulating the flow of lubricant through the discharge line of a pressure feed lubricant dispenser.

Heretofore valves employed to control the flow of lubricant under pressure through the discharge conduit of pressure feed lubricating apparatus have been patterned largely after the commonly known type of control valve having conical valve and valve seat structure; or they have followed the construction of the spring pressed ball valve with a manually operable plunger for moving the ball away from its seat against the force of the spring and the lubricant pressure to which the ball is subjected. In practice these forms of valve sufficed for little more than that of an ordinary shut off cock due to the tendency of the lubricant under pressure to force the valve to full open position subsequent to initial opening, or to a tendency to establish a sudden equalizing of pressure upon the opposite sides of the valve ball, in the plunger operated ball valve, which in practice invariably results in the operator following through with the manually operated plunger to full open position under the force applied in dislodging the ball from its seat against the lubricant pressure in the discharge line.

An object of my invention is to provide a lubricant discharge control valve wherein the flow of lubricant therethrough may be accurately controlled with uniformity of flow from initial opening to full open position.

Another object is to provide a lubricant control valve in which the action of lubricant pressure upon the valve parts upon initial opening to induce the parts to assume an increased or full open position is entirely precluded.

A further object is to provide a lubricant control valve wherein a balance of forces resulting from lubricant pressure subjected to the controlled movable element of the valve is established thereby permitting delicate manual control of the element for regulating the flow of lubricant through the valve.

Other objects, the advantages and uses of the invention, will be, or should become apparent after reading the following description and claims and after consideration of the accompanying drawings forming a part of this specification, in which:

Fig. 4 is a part sectional elevation of another form of the control valve;

Fig. 5 is a part sectional elevation of another form of the control valve;

Fig. 6 is a sectional view along the line VI—VI of Fig. 5;

In general, the lubricant discharge control valves selected for illustration herein comprise, a body member A having a valve cylinder or chamber B, an intake port C and an outlet port D communicating with the cylinder B, a valve member E within the cylinder having a recessed portion F for determining the quantity of lubricant which may flow through the valve for any given valve position and a manually operable hand lever G for shifting the valve member E in the cylinder B.

Figure 1:
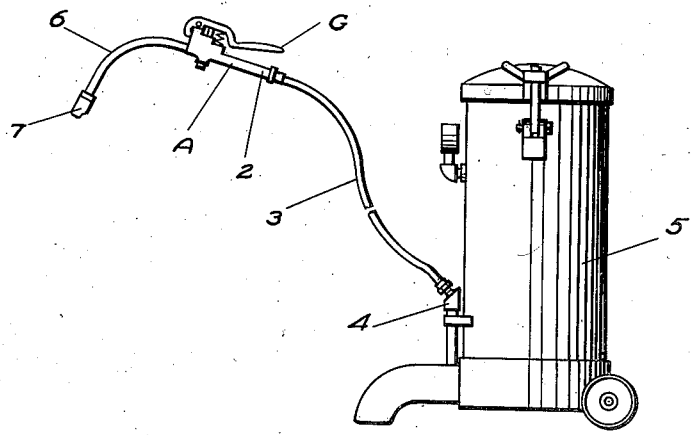
Fig. 1 is an elevation of a pressure feed lubricant dispenser illustrating one application of my improved control valve.
Figure 2:
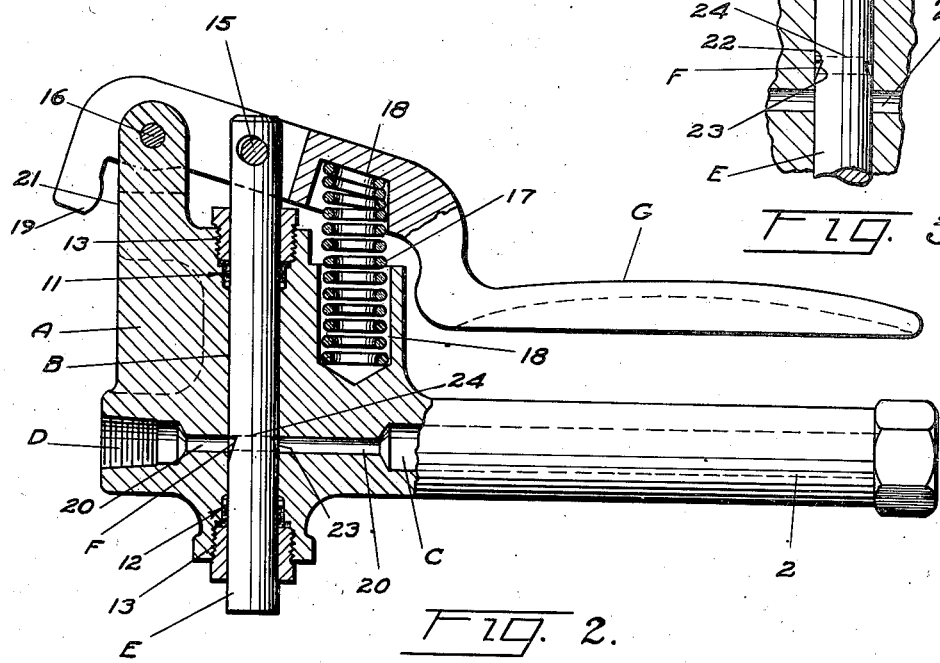
Fig. 2 is a part sectional elevation of the control valve of Fig. 1.

With reference to Figs. 1 and 2 the control valve illustrated therein has an elongated rearwardly extending portion 2 of the body A forming a rigid hand grip immediately beneath the operating hand lever G to facilitate the convenient manual support and manipulation of the valve by the operator. The inlet port C may be connected, as by a flexible hose 3, to the discharge outlet 4 of a pressure feed lubricant dispenser 5 as shown in Fig. 1. The outlet port D of the valve may be connected by a short length of hose 6 to a lubricant discharge nozzle 7 through which lubricant may be conducted to a lubricant receiving fitting with which the nozzle is engaged. This arrangement permits the operator to hold the nozzle 7 in one hand and to hold and operate the control valve with the other hand.

The valve cylinder B of the valve is formed of a bore extending entirely through the body A and provided with packing gland assemblies 11 and 12 at the upper and lower ends respectively secured within enlarged portions of the bore by cooperating screw threads 13. The valve member E is closely fitted within the cylinder B and extends through the gland assemblies 11 and 12. The upper end of the valve member E is pivotally connected at 15 to the hand lever G which in turn is pivotally mounted at 16 upon the body A. Pivotal movement of the lever G is thus translated into right line movement of the valve member E in the valve cylinder or chamber B. A compression spring 17, the ends of which are located in opposed sockets 18 formed in the body A and lever G, functions normally to hold the valve member E in an elevated position with the lever G at the limit of its outward movement. The limit of movement of the lever G, outwardly, is established by a stop 19 formed integral therewith, which may engage with the adjacent wall 21 of the body A.

Figure 3:
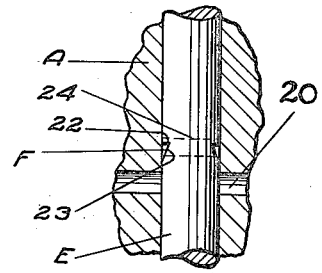
Fig. 3 is a fragmentary sectional view of the valve of Fig. 1 in closed position.

A passage 20 communicating at opposite ends with the inlet port C and outlet port D, respectively, intersects the valve cylinder B at right angles thereto as shown in Fig. 2. When the valve is in closed position, i. e., with the valve member E elevated, the passage 20 is closed by interception of the lower portion of the valve member below the recessed portion F as shown in Fig. 3. The recessed portion F comprises a pair of recesses in opposite side walls of the valve member and each are formed with one wall 22 perpendicular to the axis of the cylinder B and the other wall 23 inclined outwardly, thus providing spaces between the valve member and the wall of the cylinder B gradually increasing in cross sectional area and depth from the lower to the upper ends thereof. A transverse passage 24 is formed diametrically through the valve member at the upper end of the recesses F which serves to conduct lubricant through the valve member from the recess on the inlet side of the passage 20 to the recess on the discharge side of the passage.

In operation my improved control valve may be employed accurately to control the flow of lubricant from the dispenser 5 to the discharge nozzle 7 and to shut off lubricant flow completely when the valve member E is in the elevated position shown in Fig. 3 where it is normally held by virtue of the spring 17 acting upon the hand lever G. Assuming that the nozzle 7 is engaged with a lubricant receiving fitting and that the valve is closed, the operator may establish flow through the dispenser discharge line by pressing downwardly upon the hand lever G employing the elongated portion 2 of the valve body A as a hand grip. As the lever G is pressed toward the portion 2 of the valve body the lower parts of the recesses F are moved into registration with the passage 20 to open the passage an amount in proportion to the cross sectional area of that portion of the recesses registered with the passage. Continued movement of the hand lever G will cause an increasing flow of lubricant through the valve because of the increasing area of that portion of the recesses F moved into registration with the passage 20. This increase in flow is uniform due to the gradual and uniform slope of the wall 23 of the recesses.

It will be apparent that I have provided in the structure of the valve member E a balanced arrangement wherein lubricant under pressure may act with equal force upon the shoulder or wall 22 and the wall 23 of the recesses F and thus provide a balance in forces applied to the movable valve member E with the result that the lubricant pressure may not act to move the valve from its manually directed position nor aid nor oppose its directed change in position. This advantage is one of great importance and precludes all possibility of erratic valve operation so common in the so-called control valve representing a substantial part of the valves at present in use on lubricant servicing equipment.

In Fig. 4 I have illustrated another form of the control valve which is similar in many respects to the valve of Figs. 1 to 3 and wherein like reference numerals have been employed to designate like parts. However, instead of employing directly opposed recesses F, the recesses are arranged one above the other on opposite walls of the valve member E. The recesses F are interconnected by a bore 26 extending longitudinally of the valve member E and a pair of transverse bores 27 through the valve member intersecting the bore 26 and interconnecting the upper and the lower of the recesses F respectively. The lower end of the bore 26 is closed by a cap screw 28 which also serves to secure a packing 29 to the lower end of the valve member E. A compression spring 30 is located beneath the valve member to urge it upwardly toward the hand lever G. A passage 31 interconnects the inlet port C with the valve cylinder B and a second passage 32 interconnects the outlet port D with the valve cylinder B at a point above the mouth of the passage 31 a distance equal to the spacing of the recesses F. Engagement between the hand lever G and the valve member E is effected through a pivotal connection 15. An adjustable stop is provided for limiting the downward movement of the hand lever G in the form of a stud bolt 36, the end 37 of which extends through the spring 17 and between legs of a bifurcated portion 38 of the body A. A flange 39 is formed on the said end 37 which may abut the upper wall of the portion 38 to limit the downward movement of the hand lever. The stud bolt may be so adjusted with respect to the lever G that the valve is in full open position when the flange 39 engages the bifurcated portion 38 of the body. A lock nut 41 serves to lock the bolt 36 in its adjusted position.

As in the case of the valve first described, the valve of Fig. 4 is so balanced that the member E is not under the influence of lubricant under pressure admitted to the valve cylinder B. Control of lubricant flow is provided by the simultaneously directed registration of the recesses F with the passages 31 and 32 respectively.

The control valve of Figs. 5 and 6 differs from those of Figures 1 to 3 in that a definite force is applied to the valve member E tending to urge the valve to its closed position thereby defeating any possibility of the operator following through to full open position upon the initial opening of the valve because of the sudden equalizing of pressure as in the case of the plunger operated ball or poppet valve. In addition to this feature the valve includes a second valve automatically operable to shut off communication between the inlet port C and the control valve cylinder B. The valve member E has a longitudinal bore 46 for establishing communication between a circumferential recess F through the transverse bore 27 and that space within the cylinder B beneath the member E. This arrangement subjects the lower end of the valve member to lubricant pressure and as the area thereof is relatively large results in a substantially constant and appreciable upward thrust upon the valve member during manual operation of the valve. The shut off valve for the passage 31 comprises a spring pressed ball valve 47 and a push rod 48, one end of which bears upon the ball valve and the other of which extends within the valve cylinder B; and, with the parts in the position shown in Fig. 5, lies just clear of a tapered surface 49 formed on the lower end of the valve member. The surface 49 serves as a cam to open the valve 47 through the medium of the push rod 48 upon initial opening movement of the valve member E under influence of manual pressure applied to the hand lever G to admit lubricant under pressure to the cylinder B before the recess F is brought into registration with the passage 32. Interconnection between the lever G and valve member E is effected through a steel ball 50 under compression of the spring 30 thus permitting the valve member E to rotate during use and equalize wear.

Figure 7:
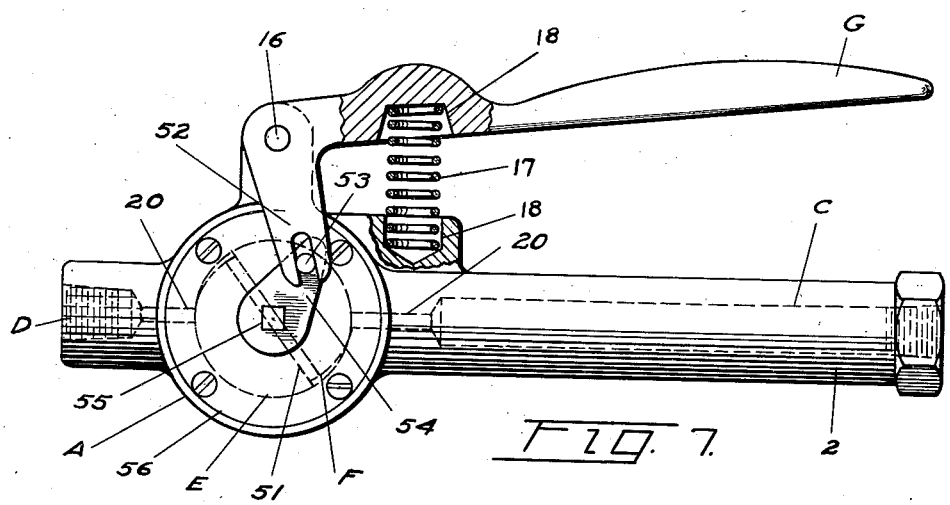
Fig. 7 is a side elevation partly in section of a further form of the control valve.
Figures 9, 10:
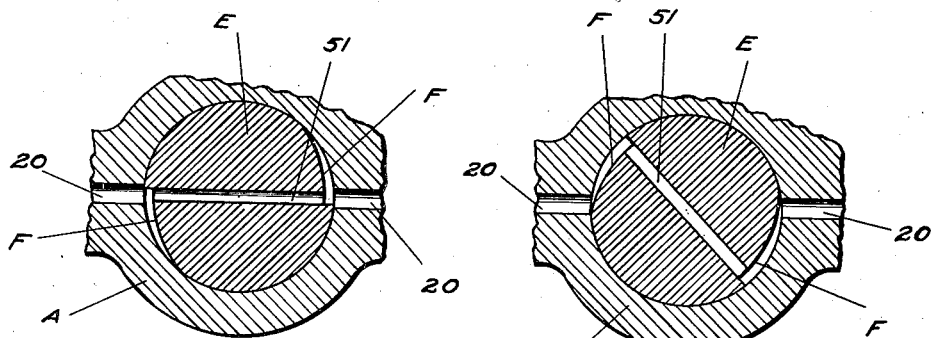
Figs. 8, 9 and 10 are fragmentary sectional views illustrating the valve mechanism of Fig. 7 in closed, initially opened and full open positions respectively.

In Figs. 7 to 10 I have shown a further modification of my improved control valve wherein the valve member E is of the rotary type and is formed with the recesses F on diametrically opposite sides thereof and extending longitudinally of the member E. A passage 51 interconnects the recesses F at their points of greatest depth. The disposition of the passage 20 is much the same as that of the valve in Fig. 2, i. e., the intersection of the cylinder B at right angles thereto. While the recesses F are not annular nor arranged to encompass the walls of the valve member E they possess similar functions in that the cross sectional area of the space provided by the recesses between the valve member and that portion of the cylinder wall about the mouths of the passage 20 increases gradually as the valve member is rotated from closed to full open position with the passage 51 aligned with the passage 20. Means for translating pivotal movement of the hand lever G to rotary movement of the valve member E is provided by an arm 52 extending radially from the lever G at its point of pivotal support 16. The outer end of the arm 52 is bifurcated to embrace a pin 53 extending laterally from an arm 54 fixed to an outwardly extending stud shaft 55 disposed along the axis of the valve member E and formed integral therewith. The stud shaft 55 may extend through a suitable packing in the end plate 56 of the cylinder B as shown in Fig. 7.

Figure 8:
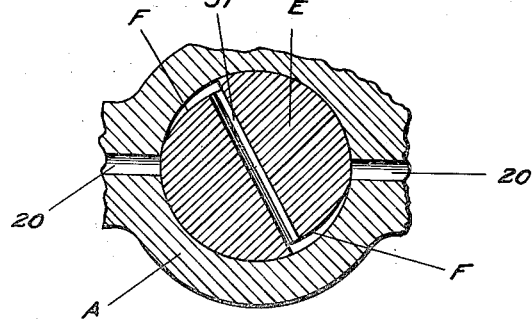

In Fig. 8 the valve member E is shown in closed position with the recesses F entirely out of registration with the passage 20. In Fig. 8 the valve member is illustrated as it may appear upon initial opening or in that position to permit a relatively small flow of lubricant therethrough and in Fig. 9 the parts are shown in full open position for maximum flow. It will be noted that a considerable angular movement of the hand lever G is required to cause an appreciable movement of the valve member E and hence an accurate control of lubricant flow may be readily maintained.

As in the case of the control valves of Figs. 1 to 3, the forces applied by lubricant pressure to the valve member E are balanced so as not to oppose, aid or alter a change in valve position.

It is to be understood that the described embodiments of the invention herein set forth are presented for the purpose of illustration only, and various changes may be made therein without departing from the spirit and scope of the invention.

I claim:

1. A control valve for lubricant and other fluids under pressure comprising, a valve chamber having an inlet and an outlet passage, a valve member adapted for movement in said chamber to close said inlet and said outlet when in one position, said valve member having intercommunicating recesses in the wall thereof of increasing cross sectional area from one end to the other, and means for moving said member to cause a desired portion of said recesses to register with said inlet and said outlet passages respectively.

2. A control valve for lubricant and other fluids under pressure comprising, a valve chamber having passages communicating therewith one of which is adapted to conduct fluid under pressure to the chamber and the other for conducting fluid away from the chamber, a valve member adapted for movement in said chamber to close at least one of said passages, said valve member having intercommunicating recesses therein of gradually increasing cross sectional area along the direction of travel thereof, and means for moving said valve member to cause a desired portion of said recesses to register with the inlet and outlet passages respectively.

3. A control valve for lubricants and other fluids under pressure comprising, a valve chamber having passages communicating therewith one of which is adapted to conduct fluid under pressure to the chamber and the other for conducting fluid away from the chamber, a valve member adapted for movement in said chamber to close at least one of said passages, resilient means for urging said valve member to said last named position, said valve member having intercommunicating recesses therein of gradually increasing cross sectional area along the direction of travel thereof, and means for moving said valve member to cause a desired portion of said recesses to register with the inlet and outlet passages respectively.

4. A control valve for lubricants and other fluids under pressure comprising, a valve chamber having an inlet passage and an outlet passage communicating therewith at spaced distances apart from one another relative to the axis of said chamber, a valve member movable in said chamber, said valve member being formed with recesses therein of increasing cross sectional area along the direction of movement thereof adapted simultaneously to register with said inlet and said outlet passages respectively upon movement of the valve member in said chamber, and means for establishing communication between the recesses of the valve member.

5. A control valve for lubricants and other fluids under pressure comprising, a valve chamber having an inlet passage and an outlet passage communicating therewith at spaced distances apart from one another relative to the axis of said chamber, a valve member movable in said chamber, said valve member being formed with recesses therein of increasing cross sectional area along the direction of movement thereof adapted simultaneously to register with said inlet and said outlet passages respectively upon movement of the valve member in said chamber, means for establishing communication between the recesses of the valve member, and manually operable means for moving said valve member to control the degree of registration of said recesses with the inlet and outlet passages.

6. A control valve for lubricants and other fluids under pressure comprising, a valve chamber having an inlet passage and an outlet passage communicating therewith at spaced distances apart from one another relative to the axis of said chamber, a valve member movable in said chamber, said valve member being formed with recesses therein of increasing cross sectional area along the direction of movement thereof adapted simultaneously to register with said inlet and said outlet passages respectively upon movement of the valve member in said chamber, means for establishing communication between the recesses of the valve member, resilient means for urging said valve member to a position to maintain the recesses out of registration with said inlet and outlet passages, and manually operable means for moving said valve member to control the degree of registration of said recesses with the inlet and outlet passages.

7. A control valve for lubricants and fluids under pressure comprising, a valve chamber having an inlet and an outlet passages, a valve member adapted for movement in said chamber, said valve member having a recess of increasing cross sectional area along the direction of movement thereof adapted to be moved into registration with one of said passages upon movement of the valve member in said chamber, resilient means for urging said valve member to a position with its recess out of registration with said last named passage, means for establishing communication between said recess and the other of said passages, and means for moving said valve member at will.

8. A control valve for lubricants and fluids under pressure comprising, a valve chamber having an inlet and an outlet passage, a valve member adapted for movement in said chamber, said valve member having a recess of increasing depth along the direction of movement thereof adapted to be moved into registration with one of said passages upon movement of the valve member in said chamber, means including a bore in said valve member controlled by the movement of said valve member for establishing communication between said recess and the other of said passages, and manually operated hand lever means for moving said valve member at will.

9. A control valve for lubricants and fluids under pressure comprising, a valve chamber having an inlet and an outlet passageway, a valve member adapted for movement in said chamber, said valve member having a recess of increasing depth along the direction of movement thereof adapted to be moved into registration with one of said passageways upon movement of the valve member in said chamber, said valve member being responsive to lubricant or fluid pressure in said valve chamber for urging said valve member toward a position with its recess out of registration with said last named passageway, means for establishing communication between said recess and the other of said passageways, and other means for moving said valve member at will.

10. A control valve for lubricant and other fluids under pressure comprising, a valve chamber having an inlet and an outlet passage, a valve member adapted for movement in said chamber to close said inlet and said outlet when in one position, said valve member having intercommunicating recesses in the wall thereof of increasing cross sectional area from one end to the other, means including a manually operable hand lever for moving said member to cause a desired portion of said recesses to register with said inlet and said outlet passages respectively, and an adjustable stop for said hand lever for arresting the opening movement of said valve member when said recesses are in predetermined maximum registration with said inlet and outlet passages.

11. A control valve for lubricants and other fluids under pressure comprising, a valve chamber having passages communicating therewith one of which is adapted to conduct fluid under pressure to the chamber and the other for conducting fluid away from the chamber, a valve member adapted for movement in said chamber to close at least one of said passages, said valve member having intercommunicating recesses therein of gradually increasing cross sectional area along the direction of travel thereof, means for moving said valve member to cause a desired portion of said recesses to register with the inlet and outlet passages respectively and an adjustable stop for arresting the opening movement of said valve member upon a predetermined maximum registration of said recesses with said passages.

12. A control valve for lubricants and other fluids under pressure comprising, a valve chamber having aligned passages communicating therewith one of which is adapted to conduct fluid under pressure to the chamber and the other for conducting fluid away from the chamber, a valve member adapted for movement in said chamber to close at least one of said passages, said valve member having intercommunicating diametrically opposed recesses therein of gradually increasing cross sectional area along the direction of travel thereof, and means for moving said valve member to cause a desired portion of said recesses simultaneously to register with the inlet and outlet passages respectively.

13. A control valve for lubricants and fluids under pressure comprising, a valve chamber having an inlet and an outlet passage, a valve member adapted for movement in said chamber, said valve member having a recess of increasing cross sectional area along the direction of movement thereof adapted to be moved into registration with one of said passages upon movement of the valve member in said chamber, means for establishing communication between said recess and the other of said passages, means for moving said valve member at will, a shut off valve in said other passage, and means operable upon initial opening movement of said valve member for opening said shut off valve.

14. A control valve for lubricants and fluids under pressure comprising, a valve chamber having an inlet and an outlet passage, a valve member adapted for movement in said chamber, said valve member having a recess of increasing cross sectional area along the direction of movement thereof adapted to be moved into registration with one of said passages upon movement of the valve member in said chamber, said valve member being responsive to lubricant or fluid pressure in said valve chamber when the valve member is being moved toward open position for urging said valve member to a position with its recess out of registration with said last named passage, means for establishing communication between said recess and the other of said passages, means for moving said valve member at will, a shut off valve for said other passage, and means operable upon initial opening movement of said valve member for opening said shut off valve.

LLOYD M. ANDREWS.